(12) United States Patent
Tian et al.

(10) Patent No.: US 12,319,981 B2
(45) Date of Patent: Jun. 3, 2025

(54) DEVICE AND METHOD FOR RECOVERING ARSENIC AND GALLIUM

(71) Applicant: Kunming University of Science and Technology, Yunnan (CN)

(72) Inventors: Yang Tian, Yunnan (CN); Haosong Yu, Yunnan (CN); Bin Yang, Yunnan (CN); Xiumin Chen, Yunnan (CN); Baoqiang Xu, Yunnan (CN); Wenlong Jiang, Yunnan (CN); Yifu Li, Yunnan (CN); Fei Wang, Yunnan (CN); Yong Deng, Yunnan (CN); Lipeng Wang, Yunnan (CN); Dong Liang, Yunnan (CN); Dong Wang, Yunnan (CN)

(73) Assignee: Kunming University of Science and Technology, Kunming (CN)

( * ) Notice: Subject to any disclaimer, the term of this patent is extended or adjusted under 35 U.S.C. 154(b) by 0 days.

(21) Appl. No.: 18/799,957

(22) Filed: Aug. 9, 2024

(65) Prior Publication Data

US 2024/0401169 A1    Dec. 5, 2024

Related U.S. Application Data

(63) Continuation of application No. PCT/CN2023/082064, filed on Mar. 17, 2023.

(51) Int. Cl.
  *C22B 58/00* (2006.01)
  *C22B 7/00* (2006.01)
  *C22B 9/04* (2006.01)

(52) U.S. Cl.
  CPC .............. *C22B 58/00* (2013.01); *C22B 7/004* (2013.01); *C22B 9/04* (2013.01)

(58) Field of Classification Search
  CPC ................................ C22B 7/004; C22B 9/04
  See application file for complete search history.

(56) References Cited

U.S. PATENT DOCUMENTS

2003/0145683 A1    8/2003   Tayama et al.

FOREIGN PATENT DOCUMENTS

| CN | 1598016 A | 3/2005 |
| CN | 101096726 A | 1/2008 |
| CN | 101413064 A | 4/2009 |
| CN | 201358292 Y | * 12/2009 |

* cited by examiner

*Primary Examiner* — Yong L Chu

(57) ABSTRACT

The present disclosure relates to a device and method for recovering arsenic and gallium. A closed furnace body is in communication with a vacuuming pipe, and the vacuuming pipe is connected to a vacuuming mechanism. The closed furnace body includes a first furnace body, a second furnace body and a third furnace body. A first heating mechanism and a graphite crucible are arranged inside the first furnace body, the first heating mechanism being used for heating the graphite crucible. A first collection cylinder is in communication with a second collection cylinder. The device for recovering arsenic and gallium of the present disclosure is arranged with a structure for realizing directional condensation of gallium arsenide clusters and arsenic vapor, respectively, to realize high-purity recovery of arsenic and gallium.

4 Claims, 2 Drawing Sheets

DEVICE AND METHOD FOR RECOVERING ARSENIC AND GALLIUM

CROSS-REFERENCE TO RELATED APPLICATIONS

This application is a continuation of PCT/CN2023/082064, filed Mar. 17, 2023 and claims priority of Chinese Patent Application No. 202211079263.7, filed on Sep. 5, 2022, the entire contents of which are incorporated herein by reference.

TECHNICAL FIELD

The present disclosure belongs to the technical field of secondary resource recovery in the metallurgical industry, and specifically relates to a device and method for recovering arsenic and gallium.

BACKGROUND

As rapid advancement has been achieved in fields such as electronic communication and aerospace in the late years, the demand for second-generation semiconductor materials represented by gallium arsenide has increased. Globally, more than 200 t of gallium is consumed annually for the production of gallium arsenide, however, the final yield of GaAs tends to be less than 20%, resulting in the generation of gallium arsenide-containing waste in various forms such as waste cut from gallium arsenide crystal rods, wastewater, slag and sludge containing gallium arsenide, and waste devices containing gallium arsenide, and gallium arsenide waste is expected to exceed 621 t in 2025. Since gallium does not form separate deposits of mining value in nature, it represents only 0.0015% in the earth's crust. Gallium arsenide waste contains nearly 50% gallium, with high grade and large stock, which is an important raw material for regenerated gallium, and also a major source of arsenic. In addition, gallium arsenide contains arsenic, which may produce highly toxic substances such as arsenic oxide fumes and arsine if improperly disposed of, causing great harm to ecological environment and human body. Therefore, there is a need to recycle arsenic and gallium from gallium arsenide waste.

A method for recovering gallium and arsenic from gallium arsenide industrial wastes was disclosed in the patent with the application number of 200510031531.8, including the steps of raw material grinding, autocatalytic leaching in nitric acid, precipitation of arsenic by sulfide, precipitation of gallium by hydroxide, alkali dissolution of gallium hydroxide, and electrolytic recovery of 4N gallium metal. This method is high in recovery rate of arsenic and gallium, but long in treatment process, which may be accompanied by arsenic-containing waste liquid, exerting large pressure on environmental protection.

A method for comprehensive recovery of gallium and arsenic from gallium arsenide industrial waste was disclosed in the patent with the application number of 200410042072.0, using a vacuum high-temperature decomposition method to heat and decompose the gallium arsenide in the pressure of 0.1-10 Pa at the temperature of 700-1000° C., and the purity of the recovered gallium metal and elemental arsenic is up to 99.99% and 99%, respectively. This method features short process, high efficiency, low cost and no pollutione, and is a promising technology. It was found in the research by Liu Dachun, Hu Liang et al. (*Theoretical Calculations and Experiments on the Vacuum Thermal Decomposition of Gallium Arsenide* [J]. China Journal of Nonferrous Metals, 2014, 24 (9): 8.) that, during thermal decomposition, gallium arsenide often produces gaseous clusters, which are mixed with arsenic vapor, resulting in a lower purity of the product arsenic and loss of gallium metal.

A vacuum decomposition device for separating gallium arsenide into gallium metal and arsenic metal was disclosed in the patent with the publication number of 200920036933.0, which achieved a high degree of decomposition of gallium arsenide and the collection of arsenic at a high temperature of 1200-1500° C., avoiding environmental pollution brought about by the generation of arsenic-containing oxides. However, the device cannot solve the key problem involving gallium arsenide clusters mixed with arsenic vapor, and it is hard to ensure the purity of the product arsenic.

A processing apparatus and method for gallium arsenide were disclosed in the patent with the publication number of 201110456230.5. The processing apparatus is a vacuum tube furnace, and the method simplifies the process of vacuum high temperature treatment of gallium arsenide and reduces the processing cost, and the products gallium and arsenic have reached 3N purity. However, the lack of temperature control and gallium arsenide powder collection device results in the loss of some resources, and the recovery rate of arsenic and gallium resources is only between 86% and 92%.

Therefore, there is a need to develop a method and device for recovering high-purity arsenic and gallium from gallium arsenide waste.

SUMMARY

To recover arsenic and gallium from gallium arsenide waste, a device and method for recovering arsenic and gallium are proposed. The device for recovering arsenic and gallium of the present disclosure is arranged with a structure for realizing directional condensation of gallium arsenide clusters and arsenic vapor, respectively, to realize high-purity recovery of arsenic and gallium. Meanwhile, the method for recovering arsenic and gallium of the present disclosure has the advantages of short process flow, simple operation, and high purity of recovered arsenic and gallium with the purity of arsenic up to 99.9% and the purity of gallium up to 99.99%.

The present disclosure is realized by the following technical solutions.

A first aspect of the present disclosure provides a device for recovering arsenic and gallium, including: a closed furnace body and a vacuuming mechanism;

the closed furnace body is in communication with the vacuuming pipe, and the vacuuming pipe is connected to the vacuuming mechanism;

the closed furnace body includes a first furnace body, a second furnace body and a third furnace body;

a first heating mechanism and a graphite crucible are arranged inside the first furnace body, the first heating mechanism being used for heating the graphite crucible;

a second heating mechanism and a first collection cylinder are arranged inside the second furnace body, the second heating mechanism being used for heating the first collection cylinder;

a second collection cylinder is arranged inside the third furnace body; and the first furnace body is detachably connected to the second furnace body, and the second furnace body is detachably connected to the third furnace body; and the graphite crucible is in communication with the first collection cylinder, and the first collection cylinder is in communication with the second collection cylinder.

Further, a heat-insulating layer is arranged between the first furnace body and the second furnace body; and/or a heat-insulating layer is arranged between the second furnace body and the third furnace body.

Further, the first collection cylinder is made of graphite; and/or the second collection cylinder is made of graphite.

Further, the first collection cylinder includes an upper communication port and a lower communication port, the upper communication port being in communication with the second collection cylinder, the lower communication port being in communication with the graphite crucible, and the upper communication port and the lower communication port not being located on the same vertical line.

Further, a liquid cooling mechanism is arranged at the third furnace body.

Further, the graphite crucible is cylindrical, having a diameter of 10-15 cm and a height of 20-25 cm.

Further, the first collection cylinder has a height of 20-30 cm.

A second aspect of the present disclosure provides a method for recovering arsenic and gallium, including a device for recovering arsenic and gallium as described above, and including the steps of:

S100: placing gallium arsenide waste in the closed furnace body, and vacuuming the closed furnace body to 1-10 Pa by the vacuuming mechanism;

S200: keeping the vacuuming mechanism continuously vacuuming, heating the graphite crucible by the first heating mechanism at a heating temperature of 800-1200° C., and heating the first collection cylinder by the second heating mechanism at the same time at a heating temperature of 500-800° C.; and S300: stopping heating by the first heating mechanism and the second heating mechanism, closing the vacuuming mechanism after the closed furnace body is cooled to room temperature, and collecting the gallium from the graphite crucible, the gallium arsenide from the first collection cylinder, and the arsenic from the second collection cylinder.

Further, a heating time of the first heating mechanism is 60-240 min.

The present disclosure includes the following beneficial effects by adopting the above technical solutions.

1. The device for recovering arsenic and gallium of the present disclosure is arranged with a structure for realizing directional condensation of gallium arsenide clusters and arsenic vapor, respectively, to realize high-purity recovery of arsenic and gallium. Meanwhile, the method for recovering arsenic and gallium of the present disclosure has the advantages of short process flow, simple operation, and high purity of recovered arsenic and gallium with the purity of arsenic up to 99.9% and the purity of gallium up to 99.99%.
2. In the present disclosure, by means of two stages of precise temperature control, the efficient separation of arsenic and gallium in short process and directional condensation recovery of gallium arsenide clusters and arsenic are achieved, the problem involving simultaneous condensation of some gallium arsenide and arsenic in the existing separation technology is solved, and the product purity is improved while avoiding the loss of arsenic and gallium resources.
3. In the present disclosure, the first collection cylinder is arranged to collect the gallium arsenide clusters in the form of powder, which can be recycled as raw materials, with a recovery rate of 99% or more, avoiding the loss of arsenic and gallium resources.
4. The vacuum thermal decomposition method employed in the present disclosure has the advantages of short process, low cost, high efficiency and environmentally friendly, and the purity of the recovered gallium is improved to 99.99% and the purity of arsenic to 99.9% without secondary heating.

BRIEF DESCRIPTION OF THE DRAWINGS

To state the technical solutions of the examples in the present disclosure clearer, the attached drawings needed in the description of examples or prior art are stated briefly below. Obviously, the drawings described below are only some examples in the present disclosure, and for those skilled in the art, other drawings can be obtained according to these drawings without creative efforts.

Figure 1:
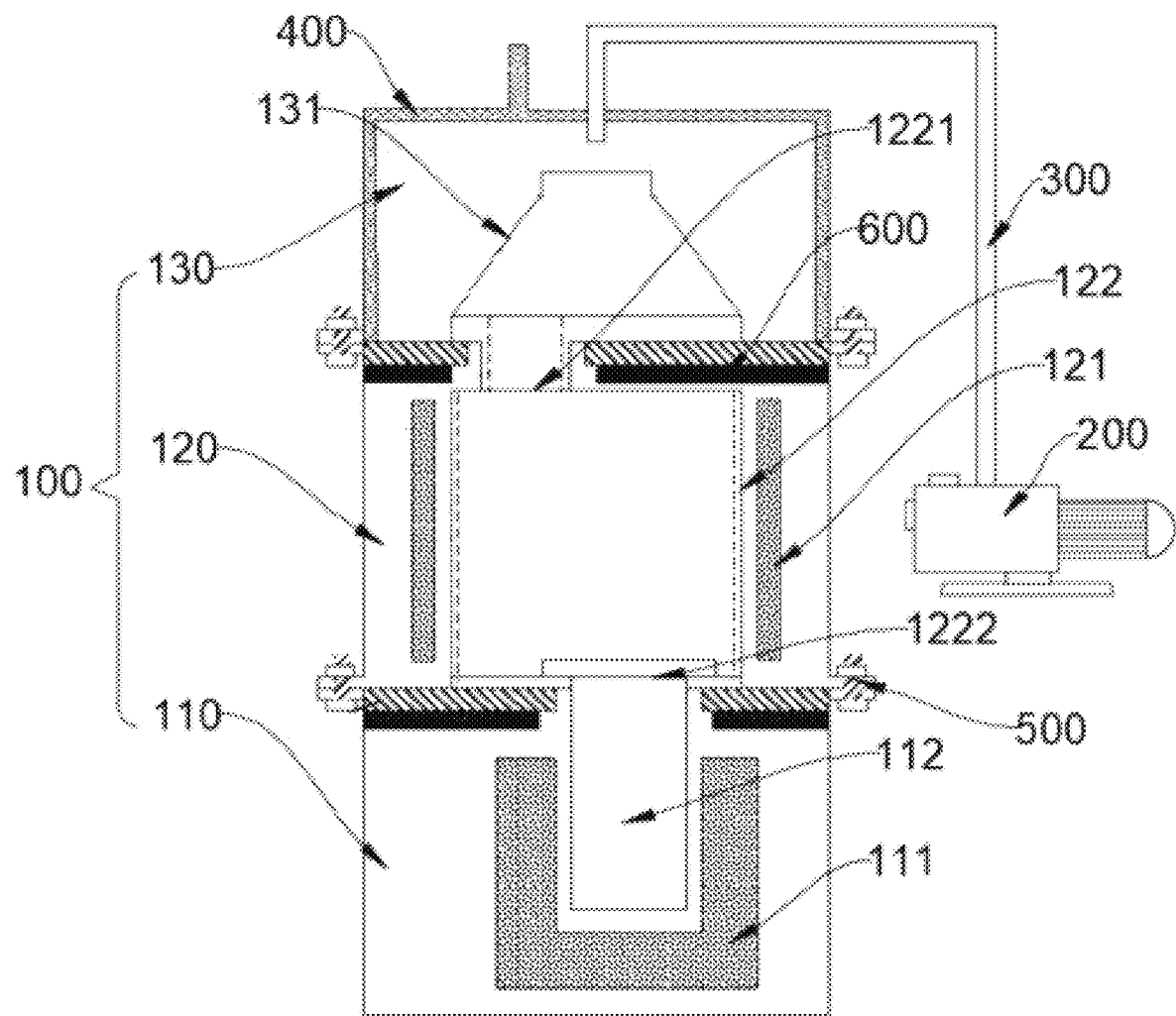
FIG. 1 shows a schematic structural diagram of a device for recovering arsenic and gallium according to an example of the present disclosure.

Reference numerals and denotations thereof: 100—closed furnace body, 110—first furnace body, 111—first heating mechanism, 112—graphite crucible, 120—second furnace body, 121—second heating mechanism, 122—first collection cylinder, 1221—upper communication port, 1222—lower communication port, 130—third furnace body, 131—second collection cylinder, 200—vacuuming mechanism, 300—vacuuming pipe, 400—liquid cooling mechanism, 500—flange, and 600—heat-insulating layer.

DETAILED DESCRIPTION

To make the objective, technical solutions and advantages of the present disclosure clearer, the present disclosure is further described in detail below with reference to the attached drawings and examples.

Example 1

In the present disclosure, the vacuum thermal decomposition method is employed to decompose gallium arsenide waste to recover arsenic and gallium separately, but in the vacuum thermal decomposition process of gallium arsenide waste, there are gallium arsenide clusters, which are mixed in the arsenic vapor generated by the decomposition; and the condensed arsenic is mixed with a large number of gallium arsenide, resulting in excessive low of arsenic in purity. On the basis of this, as shown in FIG. 1, the example provides a device for recovering arsenic and gallium, including: a closed furnace body 100, a vacuuming pipe 300, and a vacuuming mechanism 200. The closed furnace body 100 is in communication with the vacuuming pipe 300, and the vacuuming pipe 300 is connected to the vacuuming mechanism 200. The vacuuming mechanism 200 may be a vacuum pump. The closed furnace body 100 includes a first furnace body 110, a second furnace body 120 and a third furnace body 130. A first heating mechanism 111 and a graphite crucible 112 are arranged inside the first furnace body 110, the first heating mechanism 111 being used for heating the graphite crucible 112, and arranged outside of the graphite crucible 112. A second heating mechanism 121 and a first collection cylinder 122 are arranged inside the second furnace body 120, the second heating mechanism 121 being used for heating the first collection cylinder 122. A second collection cylinder 131 is arranged inside the third furnace body 130.

Both the first heating mechanism 111 and the second heating mechanism 121 may be electric heating wires. The electric heating wires are arranged on an outer surface of the graphite crucible 112, specifically, which may be surrounded on the outer surface of the graphite crucible 112. The electric heating wires are arranged on an outer surface of the first collection cylinder 122, specifically, which may be surrounded on the outer surface of the first collection cylinder 122.

The first furnace body 110 is detachably connected to the second furnace body 120, and the second furnace body 120 is detachably connected to the third furnace body 130. The first furnace body 110, the second furnace body 120, and the third furnace body 130 are connected to form the closed furnace body 100. Specifically, the first furnace body 110, the second furnace body 120, and the third furnace body 130 may be cylindrical and have equal diameters, flanges 500 are arranged at connection ends of the first furnace body 110 and the second furnace body 120, flanges 500 are arranged at two ends of the second furnace body 120, and flanges 500 are arranged at connection ends of the third furnace body 130 and the second furnace body 120; when the first furnace body 110 is connected to the second furnace body 120, fixation is achieved by bolting through the flanges 500 on the first furnace body 110 and the second furnace body 120; and when the second furnace body 120 is connected to the third furnace body 130, fixation is achieved by bolting through the flanges 500 on the second furnace body 120 and the third furnace body 130. Preferably, rubber rings are arranged at the connection ends of the first furnace body 110, the second furnace body 120, and the third furnace body 130; when the first furnace body 110 is connected to the second furnace body 120, the rubber ring arranged on the first furnace body 110 and the rubber ring arranged on the second furnace body 120 contact and squeeze each other; and when the second furnace body 120 is connected to the third furnace body 130, the rubber ring arranged on the second furnace body 120 and the rubber ring arranged on the third furnace body 130 contact and squeeze each other.

The graphite crucible 112 is in communication with the first collection cylinder 122, and the first collection cylinder 122 is in communication with the second collection cylinder 131.

Preferably, the graphite crucible 112 extends into the first collection cylinder 122 through a lower communication port 1222; and an upper communication port 1221 of the first collection cylinder 122 is connected to a conduit, and the conduit extends into the second collection cylinder 131. On the basis of this structure, the recovery rate of arsenic and gallium arsenide can be improved.

Further, a heat-insulating layer 600 is arranged between the first furnace body 110 and the second furnace body 120. On the basis of this structure, the influence of the heating temperature of the first furnace body 110 on the temperature of the second furnace body 120 can be avoided.

A heat-insulating layer 600 is arranged between the second furnace body 120 and the third furnace body 130. On the basis of this structure, the influence of the heating temperature of the second furnace body 120 on the temperature of the third furnace body 130 can be avoided.

Further, the first collection cylinder 122 is made of graphite; and/or the second collection cylinder 131 is made of graphite. The first collection cylinder 122 made of graphite is more favorable for collecting gallium arsenide, and the second collection cylinder 131 made of graphite is more favorable for collecting arsenic.

Further, the first collection cylinder 122 includes an upper communication port 1221 and a lower communication port 1222, the upper communication port 121 being in communication with the second collection cylinder 131, the lower communication port 1222 being in communication with the graphite crucible 112, and the upper communication port 1221 and the lower communication port 1222 not being located on the same vertical line. The fact that the upper communication port 1221 and the lower communication port 1222 are not located on the same vertical line is understood as that: a vertical line where the upper communication port 1221 is located is not the same as that where the lower communication port 1222 is located, and the vertical line is a line perpendicular to the closed furnace body 100 in the vertical direction; and as shown in FIG. 1, the upper communication port 1221 is staggeredly disposed with the lower communication port 1222. On the basis of this structure, condensed gallium arsenide is avoided from falling back into the graphite crucible 112.

Further, a liquid cooling mechanism 400 is arranged at the third furnace body 130. Specifically, as shown in FIG. 1, an interlayer is arranged on the third furnace body 130, and the purpose of cooling the arsenic vapor entering the third furnace body 130 is achieved by passing water through the interlayer, to increase the condensation rate of the arsenic vapor.

Further, the graphite crucible 112 is cylindrical, having a diameter of 10-15 cm and a height of 20-25 cm.

Further, the second collection cylinder 131 is tapered, the tapered shape being more conducive to the collection of arsenic.

Further, the first collection cylinder 122 has a height of 20-30 cm.

Example 2

Figure 2:
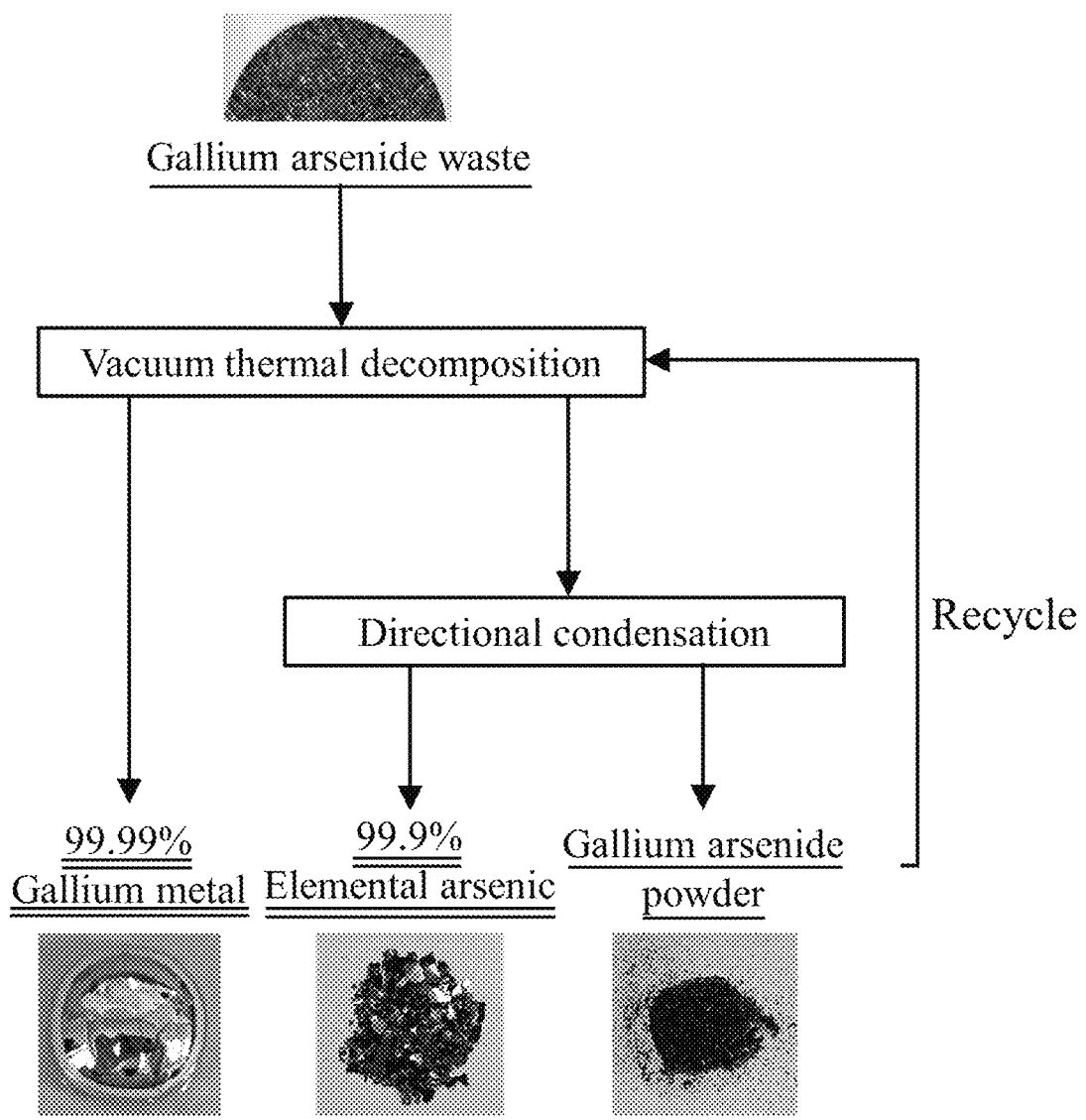
FIG. 2 shows a flow chart of a method for recovering arsenic and gallium according to an example of the present disclosure.

As shown in FIG. 2, the example provides a method for recovering arsenic and gallium, including the device for recovering arsenic and gallium as described in Example 1, and including the following steps.

S100: gallium arsenide waste is added to a graphite crucible 112, and a first furnace body 110, a second furnace body 120 and a third furnace body 130 are connected to obtain a closed furnace body 100, and a vacuuming mechanism 200 vacuums the closed furnace body 100 filled with the gallium arsenide waste to 1-10 Pa.

S200: the vacuuming mechanism 200 is kept to continuously vacuuming; the first heating mechanism 111 heats the graphite crucible 112 at a heating temperature of 800-1200° C. for a heating time of 60-240 min; and at the same time, a second heating mechanism 121 heats a first collection cylinder 122 at a heating temperature of 500-800° C. The heating temperature of 800-1200° C. and the heating time of 60-240 min of the first heating mechanism 111 can ensure sufficient thermal decomposition of the gallium arsenide in the graphite crucible 112. The heating temperature of 500-800° C. of the second heating mechanism 121 can ensure that the gallium arsenide condenses in the first collection cylinder 122, the arsenic vapor remains in a gaseous form to reach the second collection cylinder 131 and then condenses into solid arsenic.

S300: the first heating mechanism 111 and the second heating mechanism 121 stop heating, and the vacuuming mechanism 200 is closed when the closed furnace body 100 is cooled to room temperature, and the first furnace body 110, the second furnace body 120, and the third furnace body 130 are disassembled to collect gallium from the graphite crucible 112, gallium arsenide from the first collection cylinder 122, and arsenic from the second collection cylinder 131, respectively.

The recovered gallium arsenide can be added again to the graphite crucible 112 for heating.

The purity of arsenic and gallium is illustrated by the following instances:

(1) 14.79 g of gallium arsenide waste, i.e. gallium arsenide wafer (waste cut from the manufacture of gallium arsenide crystal rod) was put into a graphite crucible 112, and a first furnace body 110, a second furnace body 120 and a third furnace body 130 were connected to obtain a closed furnace body 100, which was heated after being vacuumed to 1 Pa. A first heating mechanism 111 had a heating temperature of 1050° C. and a heating time of 3 h; and a second heating mechanism 121 had a heating temperature of 600° C. and a heating time of 3 h. After the end of heating, a vacuuming mechanism 200 continued to operate until a temperature in the closed furnace body 100 was reduced to room temperature, and the vacuuming mechanism 200 was turned off. 5.9 g of gallium was obtained from the graphite crucible 112; 2.97 g of gallium arsenide was obtained from a first collection cylinder 122; and 5.81 g of arsenic was obtained from a second collection cylinder 131.

After inductively coupled plasma mass spectrometry (ICP-MS) detection, the purity of gallium obtained was up to 99.99%, reaching the national standard of gallium, and arsenic up to 99.9%, reaching the industry standard of high-purity arsenic; and the recovery rate of arsenic and gallium reached 99.26%.

(2) 15.66 g of gallium arsenide wafer was put into a graphite crucible 112, and a first furnace body 110, a second furnace body 120 and a third furnace body 130 were connected to obtain a closed furnace body 100, which was heated after being vacuumed to 1 Pa. A first heating mechanism 111 had a heating temperature of 1050° C. and a heating time of 4 h, and a second heating mechanism 121 had a heating temperature of 600° C. and a heating time of 4 h. After the end of heating, a vacuuming mechanism 200 continued to operate until a temperature in the closed furnace body 10 was reduced to room temperature, and the vacuuming mechanism 200 was turned off. 5.83 g of gallium was obtained from the graphite crucible 112; 1.97 g of gallium arsenide was obtained from a first collection cylinder 122; and 7.71 g of arsenic was obtained from a second collection cylinder 131.

After ICP-MS detection, the purity of gallium obtained was up to 99.99%, reaching the national standard of gallium, and the purity of arsenic up to 99.9%, reaching the industry standard of high-purity arsenic; and the recovery rate of arsenic and gallium reached 99.9%.

The following table shows the ICP-MS detection results (in ppm) of the gallium recovered in Instances (1) and (2).

| Element | (1) | (2) |
| --- | --- | --- |
| In | <0.5 | <0.5 |
| Cu | <0.5 | 2.11 |
| Pb | 0.63 | <0.5 |
| Al | 1.17 | 17.26 |
| Zn | 1.20 | 0.84 |
| Fe | 47.52 | 0.95 |
| Sn | <0.5 | 0.27 |
| Mg | 1.33 | 0.20 |
| Cr | 1.68 | 0.95 |
| Mn | <0.5 | <0.5 |
| Co | <0.5 | <0.5 |
| Ni | <0.5 | <0.5 |
| As | 45.27 | 5.50 |
| Si | <0.5 | <0.5 |
| Ca | <0.5 | <0.5 |

As can be seen from Instances (1) and (2), and according to the device and method for recovering arsenic and gallium provided by the present disclosure, the purity of gallium and arsenic reaches 99.99% and 99.9%, respectively; and the recovery rate of arsenic and gallium reaches 99% or more.

The above described are merely the preferred examples of the present disclosure, and the present disclosure is not limited thereto. Any modifications, equivalent replacements, improvements and the like made within the spirit and principles of the present disclosure are to be included in the scope of protection of the present disclosure.

The invention claimed is:

1. A method of using a device for recovering arsenic and gallium,
the device for recovering arsenic and gallium comprising: a closed furnace body, a vacuuming mechanism and a vacuuming pipe, wherein the closed furnace body is in communication with the vacuuming pipe, and the vacuuming pipe is connected to the vacuuming mechanism; the closed furnace body comprises a first furnace body, a second furnace body and a third furnace body; a first heating mechanism and a graphite crucible are arranged inside the first furnace body, the first heating mechanism being configured to be used for heating the graphite crucible, and the graphite crucible being configured to be used for eventually collecting gallium; a second heating mechanism and a first collection cylinder are arranged inside the second furnace body, the second heating mechanism being configured to be used for heating the first collection cylinder, and the first collection cylinder being configured to be used for collecting gallium arsenide; a second collection cylinder is arranged inside the third furnace body, the second collection cylinder being configured to be used for collecting arsenic; the first furnace body is detachably connected to the second furnace body, and the second furnace body is detachably connected to the third furnace body; and the graphite crucible is in communication with the first collection cylinder, and the first collection cylinder is in communication with the second collection cylinder; the first collection cylinder comprises an upper communication port and a lower communication port, the upper communication port being in communication with the second collection cylinder, the lower communication port being in communication with the graphite crucible, and the upper communication port and the lower communication port not being located on the same vertical line; a heat-insulating layer is arranged between the first furnace body and the second furnace body; and a heat-insulating layer is arranged between the second furnace body and the third furnace body; and a liquid cooling mechanism is arranged at the third furnace body;

the method comprising the following steps: S100: placing gallium arsenide waste in the graphite crucible, and vacuuming the closed furnace body to 1-10 Pa by the vacuuming mechanism; S200: keeping the vacuuming mechanism continuously vacuuming, heating the graphite crucible by the first heating mechanism at a heating temperature of 800-1200° C. for a heating time of 60-240 min; and heating the first collection cylinder by the second heating mechanism at the same time at a heating temperature of 500-800° C.; and S300: stopping heating by the first heating mechanism and the second heating mechanism, closing the vacuuming mechanism after the closed furnace body is cooled to room temperature, and collecting the gallium from the graphite crucible, the gallium arsenide from the first collection cylinder, and the arsenic from the second collection cylinder.

2. The method of using a device for recovering arsenic and gallium according to claim 1, wherein the first collection cylinder is made of graphite; and/or the second collection cylinder is made of graphite.

3. The method of using a device for recovering arsenic and gallium according to claim 1, wherein the graphite crucible is cylindrical, having a diameter of 10-15 cm and a height of 20-25 cm.

4. The method of using a device for recovering arsenic and gallium according to claim 1, wherein the first collection cylinder has a height of 20-30 cm.

* * * * *